United States Patent
Huang et al.

(10) Patent No.: US 8,300,727 B2
(45) Date of Patent: Oct. 30, 2012

(54) METHOD AND APPARATUS FOR SELECTING PRE-CODING VECTORS

(75) Inventors: Min Huang, Beijing (CN); Miao Wei, Beijing (CN); Zhou Shidong, Beijing (CN); Gang Wu, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 523 days.

(21) Appl. No.: 12/528,096

(22) PCT Filed: Feb. 22, 2008

(86) PCT No.: PCT/IB2008/050643
§ 371 (c)(1), (2), (4) Date: Sep. 21, 2009

(87) PCT Pub. No.: WO2008/104907
PCT Pub. Date: Sep. 4, 2008

(65) Prior Publication Data
US 2010/0027713 A1  Feb. 4, 2010

(30) Foreign Application Priority Data
Feb. 28, 2007  (CN) .......................... 2007 1 0084382

(51) Int. Cl.
*H04K 1/02* (2006.01)
(52) U.S. Cl. ........ 375/296; 375/267; 375/260; 370/344; 370/203; 370/278; 370/329
(58) Field of Classification Search .................. 375/296, 375/267; 370/344, 203, 278
See application file for complete search history.

(56) References Cited

U.S. PATENT DOCUMENTS

| | | | |
|---|---|---|---|
| 7,088,671 B1* | 8/2006 | Monsen | 370/203 |
| 2006/0270360 A1 | 11/2006 | Han et al. | |
| 2007/0217540 A1* | 9/2007 | Onggosanusi et al. | 375/267 |
| 2008/0049709 A1* | 2/2008 | Pan et al. | 370/344 |
| 2009/0219838 A1* | 9/2009 | Jia et al. | 370/278 |
| 2010/0316154 A1* | 12/2010 | Park et al. | 375/267 |

FOREIGN PATENT DOCUMENTS

| | | |
|---|---|---|
| EP | 1699145 A2 | 9/2006 |
| WO | 2006062356 A1 | 6/2006 |
| WO | 2006117665 A1 | 11/2006 |

OTHER PUBLICATIONS

Kim et al: "On the Performance of Limited Feedback Single- / Ulti-User MIMO in 3GPP LTE Systems"; Wireless Communication Systems, Sep. 1, 2006, pp. 684-688.

(Continued)

*Primary Examiner* — Eva Puente

(57) ABSTRACT

A method for selecting pre-coding vectors in a base station of a multi-user MIMO system, comprising: transmitting a plurality of pilot signals without being precoded to the plurality of terminals; receiving a plurality of feedback signals from the terminals, wherein at least one feedback signal includes a plurality of recommended pre-coding vector information and a plurality of channel status information, and each of the channel status information corresponds to a recommended pre-coding vector information; generate a pre-coding codebook based on the plurality feedback signals, wherein at least one pre-coding vector in the pre-coding codebook is determined based on a correlation coefficient between at least two recommended pre-coding vectors; and performing a transmission operation using the pre-coding codebook.

22 Claims, 6 Drawing Sheets

OTHER PUBLICATIONS

Li et al: "On the Performance of MIMO-OFDM Beamforming Systems With Feedback Delay"; IEEE International Conference on Wireless Communications, Networking and Mobile Computing, Sep. 2006, pp. 1-4.

Kim et al: "An Overview of MIMO Technologies for Enhanced 3GPP HSDPA"; Telecommunications Review, vol. 14, No. 3, 2004, pp. 1-19.

Kim et al: "Limited Feedback Precoding for Wireless MIMO Broadcast Channels"; In Proc. 1st: Mobile and Wireless Communication Summit, 2005, 5 Page Document.

* cited by examiner

METHOD AND APPARATUS FOR SELECTING PRE-CODING VECTORS

FIELD OF THE INVENTION

The present invention relates to a multi-user multi-input multi-output (MIMO) communication system, and more particularly to a method and apparatus for selecting pre-coding vectors in a multi-user MIMO communication system.

BACKGROUND OF THE INVENTION

A next generation communication system aims at providing high rate data transmission, high spectrum utilization and large system capacity. The MIMO technique has been focused on and researched for several years, since it proved to be capable of improving the data transmission rate and system capacity dramatically. However, in a multi-user MIMO system, since techniques of joint detection, spatial code, etc. could not be used together with user terminals because antennas between different users are independent from each other, it is needed to transfer information about channel characteristics acquired by each terminal to the network, so that techniques, such as the multi-user interference technique, could be further adopted in base stations.

However, in practice, since the bandwidth of a feedback channel between a terminal and a base station is limited and thus limits the amount of feedback information, there is a need for a method such that, in the case of limited feedback and user selection diversity, the base station could acquire exact information on channel characteristics etc. known by each terminal, thus enabling, for different channel characteristics of different users, to improve the data transmission rate and system capacity etc. through optimizing the selection of pre-coding vectors.

For optimizing the selection of pre-coding vectors, a method for per-user unitary rate control (PU2RC) has been proposed in a Patent Application with Serial No. EP1699145A2, entitled "Beam and power allocation method for MIMO communication system", filed in March, 2006 by SAMSUNG Company. However, there is a limitation in PU2RC, i.e. that the pre-coding codebook used by a base station must be a unitary matrix, i.e., any two pre-coding vectors in the pre-coding codebook should be orthogonal to each other, so that the selection range of pre-coding vectors is limited, thus resulting in that the pre-coding codebook selected in most cases could only meet requirements of partial users for transmission rate and signal-noise ratio at the cost of other users' performance. Consequently, the total data transmission rate and total system capacity of the system as a whole are further limited.

Therefore, there is a need to propose a method that is capable of improving the total data transmission rate and total system capacity of a system through further optimizing the selection of pre-coding vectors.

OBJECT AND SUMMARY OF THE INVENTION

An object of the invention is to provide a method of recommending pre-coding vectors, which could feed back channel informations acquired by each terminal and desired pre-coding vectors to base stations.

Another object of the invention is to provide a method for data transmission, which serves to optimize the selection of pre-coding vectors in base stations based on the information fed back by each terminal so as to improve the total system performance.

For optimizing the selection of pre-coding vectors in a multi-user MIMO system, according to an embodiment of the invention, there is provided a method of recommending pre-coding vectors that is performed in a terminal, the method including: calculating a channel response matrix using a plurality of received signals, wherein each element of the channel response matrix describes a channel status response of a channel between the terminal and a corresponding base station; calculating a plurality of channel status informations using a predefined pre-coding codebook and the channel response matrix, wherein each of the plurality of channel status informations corresponds to a pre-coding vector in the predefined pre-coding codebook; selecting a plurality of pre-coding vectors from the predefined pre-coding codebook as a recommended pre-coding codebook, using the correlation between the pre-coding vectors of the predefined pre-coding codebook and the plurality of channel status informations; and generating a feedback signal based on the recommended pre-coding codebook and the corresponding plurality of channel status informations, and transmitting the feedback signal to the base station, wherein each of the channel status informations corresponds to a recommended pre-coding vector in the recommended pre-coding codebook.

According to an embodiment of the invention, there is provided a method of transmitting data in a multi-user MIMO system, which comprises a base station and a plurality of terminals, the method comprising the steps of: receiving a plurality of feedback signals from the plurality of terminals, wherein at least one feedback signal includes a plurality of recommended pre-coding vector informations and a plurality of channel status informations (CSI), each of the channel status informations corresponding to a recommended pre-coding vector information, and each of the recommended pre-coding vector informations being used for determining a corresponding pre-coding vector in a predefined pre-coding codebook as a recommended pre-coding vector; generating a pre-coding codebook based on the plurality of feedback signals, wherein at least one pre-coding vector in the pre-coding codebook is determined based on a correlation coefficient between at least two recommended pre-coding vectors; and performing the transmission operation using the pre-coding codebook.

Alternatively, the step of generating a pre-coding codebook further includes the steps of: selecting a maximum channel status information from all the channel status informations; determining a pre-coding vector and a terminal corresponding to the maximum channel status information and a transmitting antenna corresponding to the determined pre-coding vector and the determined terminal, so as to allocate the determined pre-coding vector to the transmitting antenna; for each of the other channel status informations, performing a weighting operation on the channel status information, based on the correlation coefficient between the determined pre-coding vector and a pre-coding vector corresponding to the channel status information, to acquire a corresponding weighted channel status information; selecting a maximum weighted channel status information from all the weighted channel status informations; and determining a pre-coding vector and a terminal corresponding to the maximum weighted channel status information, so as to allocate the newly determined pre-coding vector to the terminal.

Alternatively, the method further includes the following steps: for each weighted channel status information generated in the previous weighting step, performing a weighting operation on the weighted channel status information, according to the correlation coefficient between a determined pre-coding vector determined in the previous determining step and a pre-coding vector corresponding to the weighted channel status information, to update the weighted channel status information; selecting a maximum weighted channel status information from all the weighted channel status informations that have been updated; and determining a pre-coding vector and a terminal corresponding to the maximum weighted channel status information and a transmitting antenna corresponding to the terminal, so as to allocate the determined pre-coding vector to the transmitting antenna.

The basic concept of the invention is: in a base station, to try to select the pre-coding vectors having the best(?) correlation, using correlation characteristics between pre-coding vectors and different channel characteristics obtained by a plurality of terminals, to form a pre-coding codebook enabling data to be transmitted to be pre-coding vector modulated. Unlike the method proposed in EP 1699145A2, the above pre-coding codebook is not generated by selecting pre-coding vectors merely through the comparison of the magnitudes of channel responses, but rather by selecting a plurality of pre-coding vectors that correspond to larger channel responses and have better correlation with each other, taking into account the correlation characteristics between pre-coding vectors and the magnitudes of the corresponding channel responses. The method of the invention does not need any two pre-coding vectors in the pre-coding codebook being strictly orthogonal with each other, so as to widen the selection range of pre-coding vectors, take different users' needs into account sufficiently, and improve the total data transmission rate and total system capacity of a system.

Alternatively, in terminals, a weighting operation is performed on measured channel responses of different channels using the correlation characteristics between a plurality of pre-coding vectors, so as to generate a recommended pre-coding codebook. Unlike the method proposed in EP1699145A2, the recommended pre-coding codebook is not generated by recommending pre-coding vectors merely through the comparison of the magnitudes of a plurality of channel responses, but rather by recommending, in connection with the correlation characteristics between pre-coding vectors and corresponding channel responses, pre-coding vectors that correspond to larger channel responses and have a better correlation with each other.

These and other aspects and effects of the invention will be more apparent and easy to understand through the following description in connection with the drawings and the claims.

BRIEF DESCRIPTION OF THE DRAWINGS

In all Figures, the same or similar reference numbers refer to the same or similar functions and features.

DETAILED DESCRIPTION OF THE INVENTION

Figure 1:
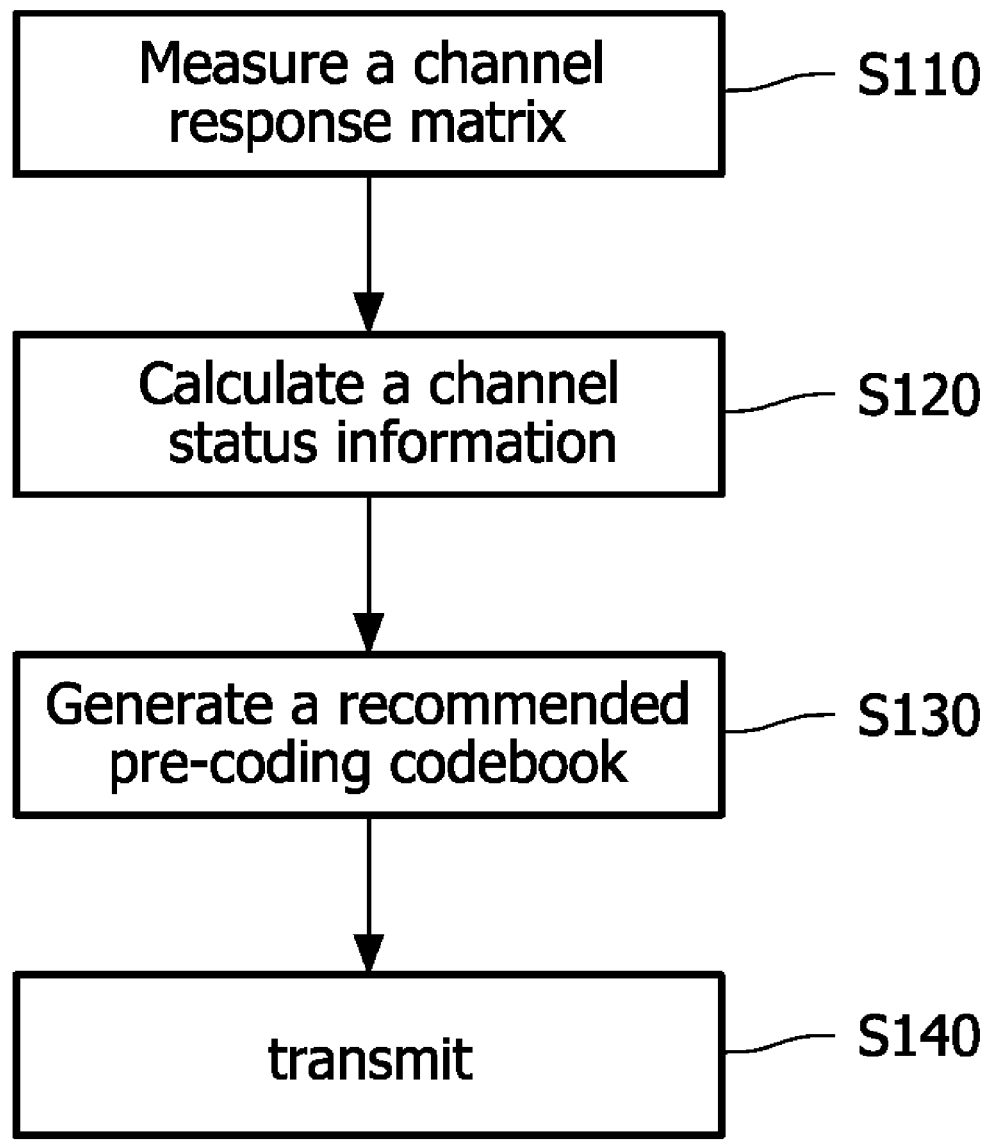
FIG. 1 illustrates a flow chart of generating a recommended pre-coding codebook in a terminal according to an embodiment of the invention.

FIG. 1 illustrates a flow chart of a method of generating recommended pre-coding vectors that is performed in a terminal according to an embodiment of the invention. In the method 100, first, at step S110, the terminal receives a plurality of signals from a base station, measures channel responses corresponding to a plurality of channels that are used for transmitting the plurality of signals, and generates a channel response matrix. Each element of the channel response matrix represents the channel response of the transmission channel between a receiving antenna of the terminal and a transmitting antenna of a corresponding base station.

At step S120, the terminal extracts a pre-coding vector each time from a known predefined pre-coding codebook, and calculates a channel status information corresponding to the pre-coding vector, using the channel response matrix obtained at step S110. After traversing all the pre-coding vectors in the predefined pre-coding codebook, the terminal obtains different channel status information corresponding to different pre-coding vectors. The channel status information may be a signal-noise ratio SNR, a signal-interference ratio SINR, or a channel quality indicator CQI. The channel status information may be calculated according to the equation $$CSI_i = \frac{t_i^H H^H H t_i}{\sum_{j \in \phi_i} t_j^H H^H H t_j + N_0}, \quad i = \{1, \ldots, M\},$$

wherein, $t_i$ represents the i th pre-coding vector in the predefined pre-coding codebook $T = \{t_1, t_2, \ldots t_M\}$, H represents the channel response matrix, $\phi_i$ represents a set composed of the pre-coding vectors in the predefined pre-coding codebook other than $t_i$, $N_0$ represents a noise variance of a channel, and $CSI_1$ represents the channel status information corresponding to the pre-coding vector $t_i$.

At step S130, a recommended pre-coding codebook is generated using the correlation characteristics between pre-coding vectors and corresponding channel status information, wherein, each of the recommended pre-coding vectors is a pre-coding vector in the predefined pre-coding codebook.

At step S140, the terminal transmits the recommended pre-coding codebook and the corresponding channel status information to the base station, wherein, each of the channel status informations corresponds to a recommended pre-coding vector. Alternatively, each of the recommended pre-coding vectors themselves may be transmitted back to the base station, or the index number of the recommended pre-coding vector in the predefined pre-coding codebook may be transmitted back to the base station for saving bandwidth.

Figure 2:
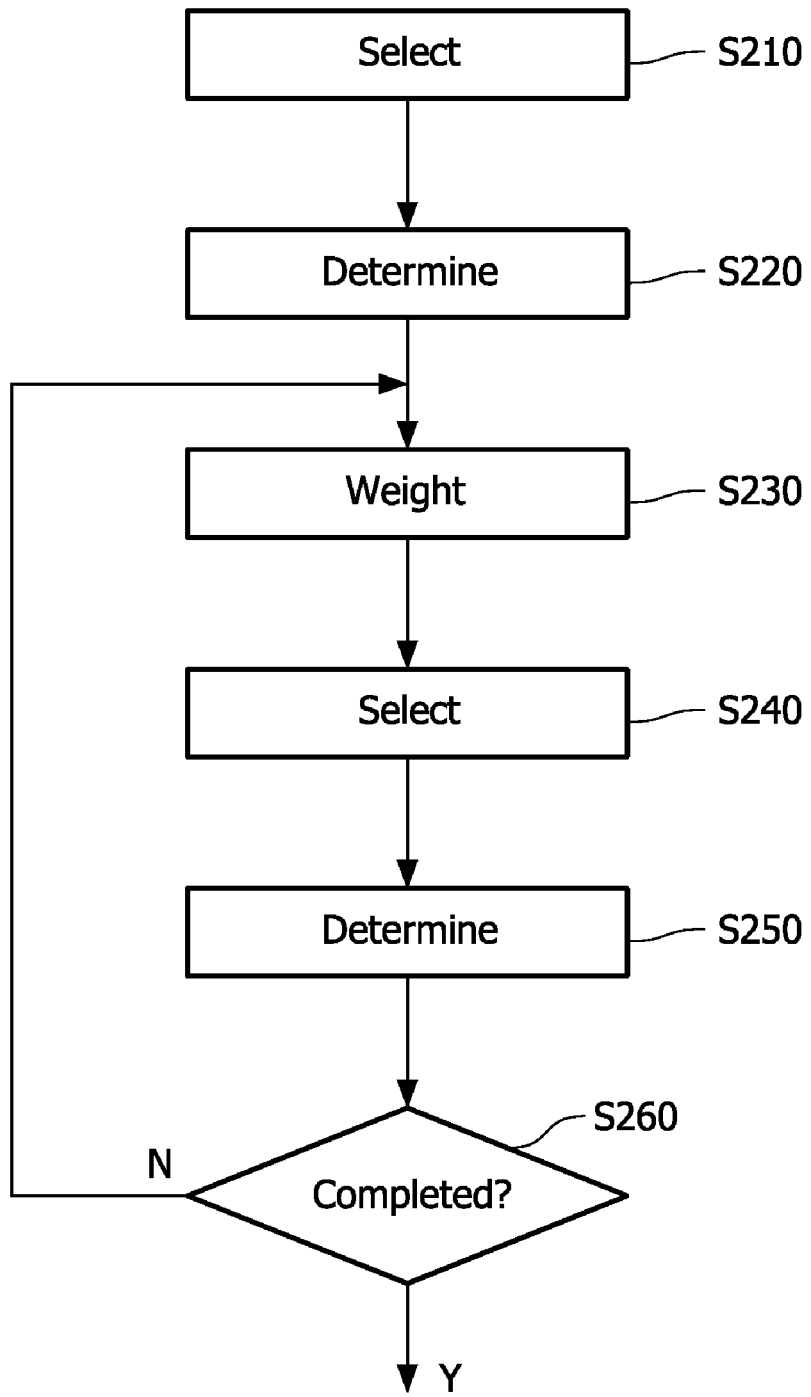
FIG. 2 illustrates a detailed flow chart of the step of recommending according to an embodiment of the invention.

FIG. 2 illustrates a flow chart of the method of generating the recommended pre-coding codebook at step S130 according to an embodiment of the invention. First, at step S210, a channel status information having the largest value is selected from a plurality of channel status informations. At step S220, a corresponding pre-coding vector is found, through the corresponding relation between a channel status information and a pre-coding vector, as a first recommended pre-coding vector to be added to the recommended pre-coding codebook. At step S230, a weighting operation is performed on the other channel status informations, using the correlation characteristics between different pre-coding vectors, so as to obtain a plurality of weighted channel status informations. Alternatively, the weighting operation may follow the equation $CSI_{current}(i) = f(e_i, e_j)^\alpha CSI_{previous}(i)^\beta$, wherein, $f(e_i, e_j)$ is the correlation coefficient between the pre-coding vectors $e_i$ and $e_j$, the pre-coding vector $e_j$ is the first recommended pre-coding vector, the pre-coding vector $e_i$ is the pre-coding vector corresponding to the channel status information, $CSI_{previous}(i)$ is the channel status information, $CSI_{current}(i)$ is the weighted channel status information. The correlation coefficient may be calculated according to the equation $$f(e_i, e_j) = \sqrt{1 - \left|\frac{e_i^H e_j}{\|e_i\| \cdot \|e_j\|}\right|^2}$$

or $$f(e_i, e_j) = 1 - \left|\frac{e_i^H e_j}{\|e_i\| \cdot \|e_j\|}\right|.$$

At step S240, a maximum weighted channel status information is selected from a plurality of weighted channel status informations, and at step S250, a corresponding pre-coding vector is determined as a new recommended pre-coding vector to be added to the recommended pre-coding codebook. At step S260, it is determined whether the recommending step has been completed under predefined criteria, if not, reversion to step S230 takes place, otherwise, there is proceeded to step S140. The predefined criteria may be whether a predefined number of pre-coding vectors have been recommended, or whether the channel status information other than the channel status information corresponding to the recommended pre-coding vectors is larger than a predefined threshold, so that there is a need to continue recommending, etc. During the cycles composed of S230, S240 and S250, in the equation $CSI_{current}(i)=f(e_i,e_j)^\alpha CSI_{previous}(i)^\beta$, $CSI_{previous}(i)$ may also represent a weighted channel status information before the current weighting step, and $CSI_{current}(i)$ may also represent a weighted channel status information obtained in the current weighting step.

Through the embodiment of FIGS. 1 and 2, the terminal could generate a recommended pre-coding codebook including a plurality of recommended pre-coding vectors, and transmit the pre-coding codebook and corresponding channel status information to the base station, so that the base station could optimize the selection of pre-coding vectors. In comparison, the method proposed in EP1699145A2 determines the best suitable pre-coding vector for the terminal only by comparing the magnitudes of signal-noise ratios.

Figure 3:
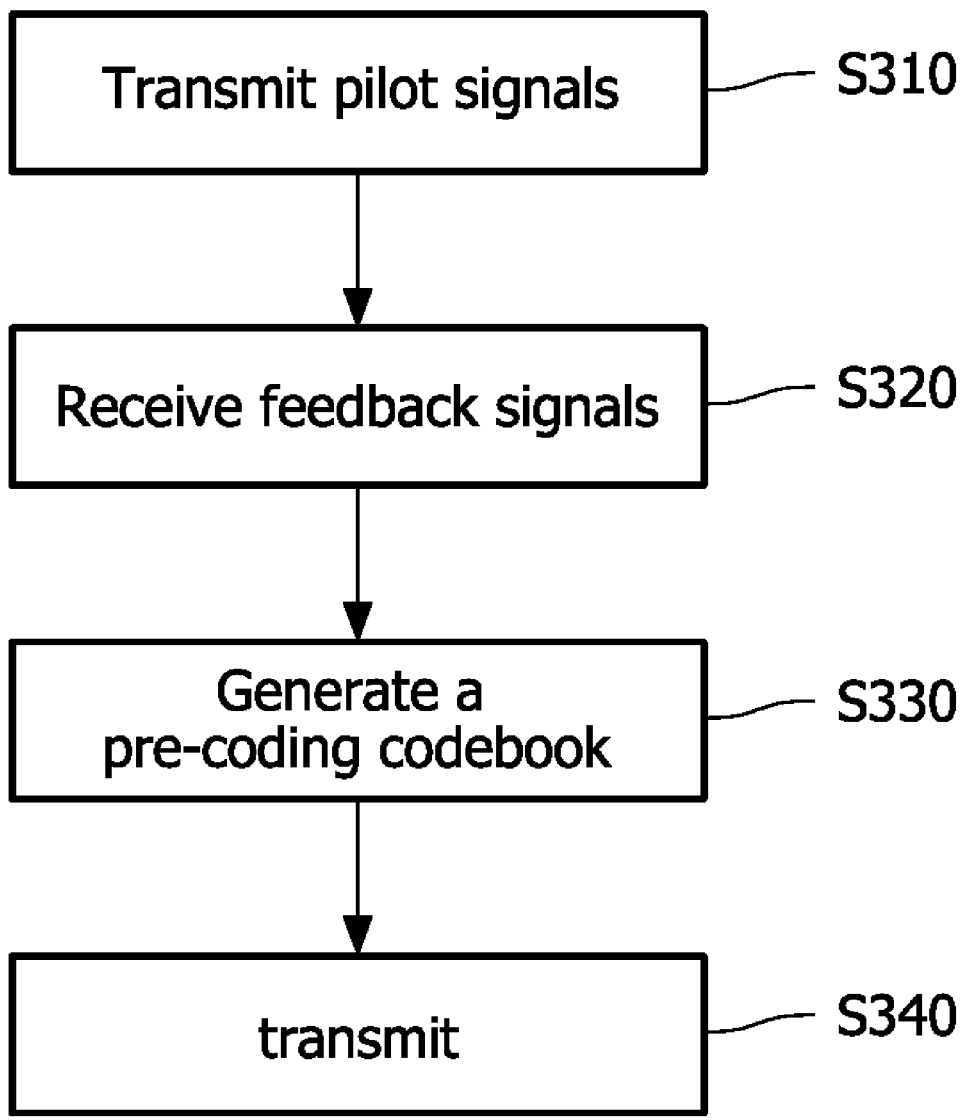
FIG. 3 illustrates a flow chart of generating a pre-coding codebook in a base station according to an embodiment of the invention.

FIG. 3 illustrates a flow chart of a method of transmitting data by optimizing the selection of pre-coding vectors that is performed in a base station according to an embodiment of the invention. In method 300, first, at step S310, a plurality of signals is transmitted from the base station to a plurality of terminals, wherein each of the signals may be a pilot signal or a signal including a pilot signal. The base station does not perform a preceding operation on the pilot signal or the pilot portion, for the terminal measures a corresponding channel response by evaluating received pilot signals. At step S320, the base station receives a plurality of feedback signals from the plurality of terminals, wherein at least one of the feedback signals includes a plurality of recommended pre-coding vectors and a plurality of corresponding channel status informations. Alternatively, the recommended pre-coding vectors included in the feedback signals may be pre-coding vectors or the index numbers of the pre-coding vectors in a predefined pre-coding codebook that can be used for determining corresponding pre-coding vectors. At step S330, the base station generates a pre-coding codebook, using the correlation characteristics between the recommended pre-coding vectors that are obtained or meet predefined criteria. Each pre-coding vector of the pre-coding codebook is a recommended pre-coding vector in the recommended pre-coding codebook transmitted from the terminal, and the determining procedure of the pre-coding vector utilizes the correlation characteristics between the recommended pre-coding vectors and the corresponding channel status information. After the pre-coding codebook is obtained, the base station performs a transmission operation on subsequent signals, using (?) the pre-coding codebook at step S340.

Figure 4:
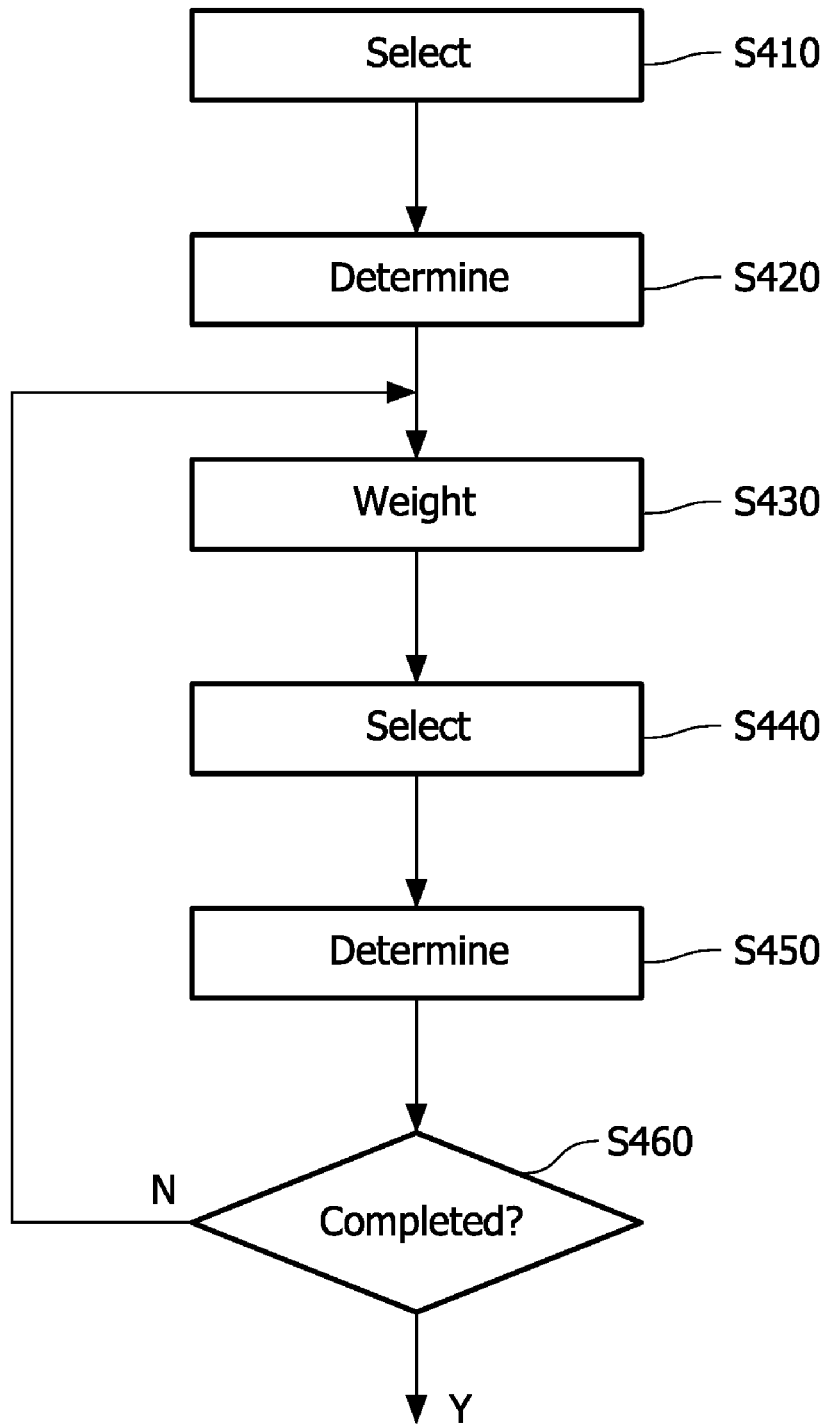
FIG. 4 illustrates a detailed flow chart of the step of generating a pre-coding codebook according to an embodiment of the invention.

FIG. 4 illustrates a flow chart of a method of generating a pre-coding codebook according to an embodiment of the invention. Firstly, at step S330, the base station selects the maximum channel status information from all the received channel status informations at step S410. At step S420, the base station determines a pre-coding vector and a corresponding terminal corresponding to the maximum channel status information, and a transmitting antenna corresponding to the determined pre-coding vector and the determined terminal, so as to allocate the determined pre-coding vector to the transmitting antenna. At step S430, for each of the other channel status informations, the base station performs a weighting operation on the channel status information, based on the correlation coefficient between the determined pre-coding vector and a pre-coding vector corresponding to the channel status information, to acquire corresponding weighted channel status information. The weighting operation may follow the equation $CSI_{current}(i)=f(e_i,e_j)^\alpha CSI_{previous}(i)^\beta$, wherein, $f(e_i,e_j)$ is the correlation coefficient between the pre-coding vectors $e_i$ and $e_j$, the pre-coding vector $e_j$ is the determined pre-coding vector, the pre-coding vector $e_i$ is the pre-coding vector corresponding to the channel status information, $CSI_{previous}(i)$ is the channel status information, $CSI_{current}(i)$ is the weighted channel status information. The correlation coefficient may be calculated according to the equation $$f(e_i, e_j) = \sqrt{1 - \left|\frac{e_i^H e_j}{\|e_i\| \cdot \|e_j\|}\right|^2}$$

or $$f(e_i, e_j) = 1 - \left|\frac{e_i^H e_j}{\|e_i\| \cdot \|e_j\|}\right|.$$

Thereafter, the base station selects, at step S440, a maximum weighted channel status information from all the weighted channel status informations, and determines, at step S450, a pre-coding vector and a corresponding terminal corresponding to the maximum weighted channel status information and a transmitting antenna corresponding to the determined pre-coding vector and the determined terminal, so as to allocate the determined pre-coding vector to the transmitting antenna. At step S460, it is determined whether sufficient determined pre-coding vectors have been obtained so as to form a pre-coding codebook. If not, reversion to step S430 takes place; otherwise, the pre-coding codebook is generated and there is proceeded to step S340. During the cycles composed of S430, S440 and S450, in the equation $CSI_{current}(i)=f(e_i,e_j)^\alpha CSI_{previous}(i)^\beta$, $CSI_{previous}(i)$ may also represent a weighted channel status information before the current weighting step, $CSI_{current}(i)$ may also represent a weighted channel status information obtained in the current weighting step, the pre-coding vector $e_j$ is the determined pre-coding vector that is determined by the operation in the previous cycle, and the pre-coding vector $e_i$ is the pre-coding vector corresponding to the channel status information in the current weighting operation.

Unlike the method proposed in EP1699145A2, the pre-coding codebook obtained through the embodiment in FIGS. 3 and 4 may be a unitary matrix in which any two pre-coding vectors are orthogonal to each other, or a non-unitary matrix, with the correlation coefficient being smaller than 1, in which there are two pre-coding vectors that are not strictly orthogonal to each other. Through the method of the embodiment in FIGS. 3 and 4, a pre-coding codebook, which has a better correlation (i.e., the correlation coefficient is large) and the corresponding channel status response is also large, could be selected, so that each antenna could be allocated to a suitable pre-coding vector, the corresponding terminal may obtain a higher data transmission rate, and further the total data transmission rate and system capacity obtained by the system may be higher.

Figure 5:
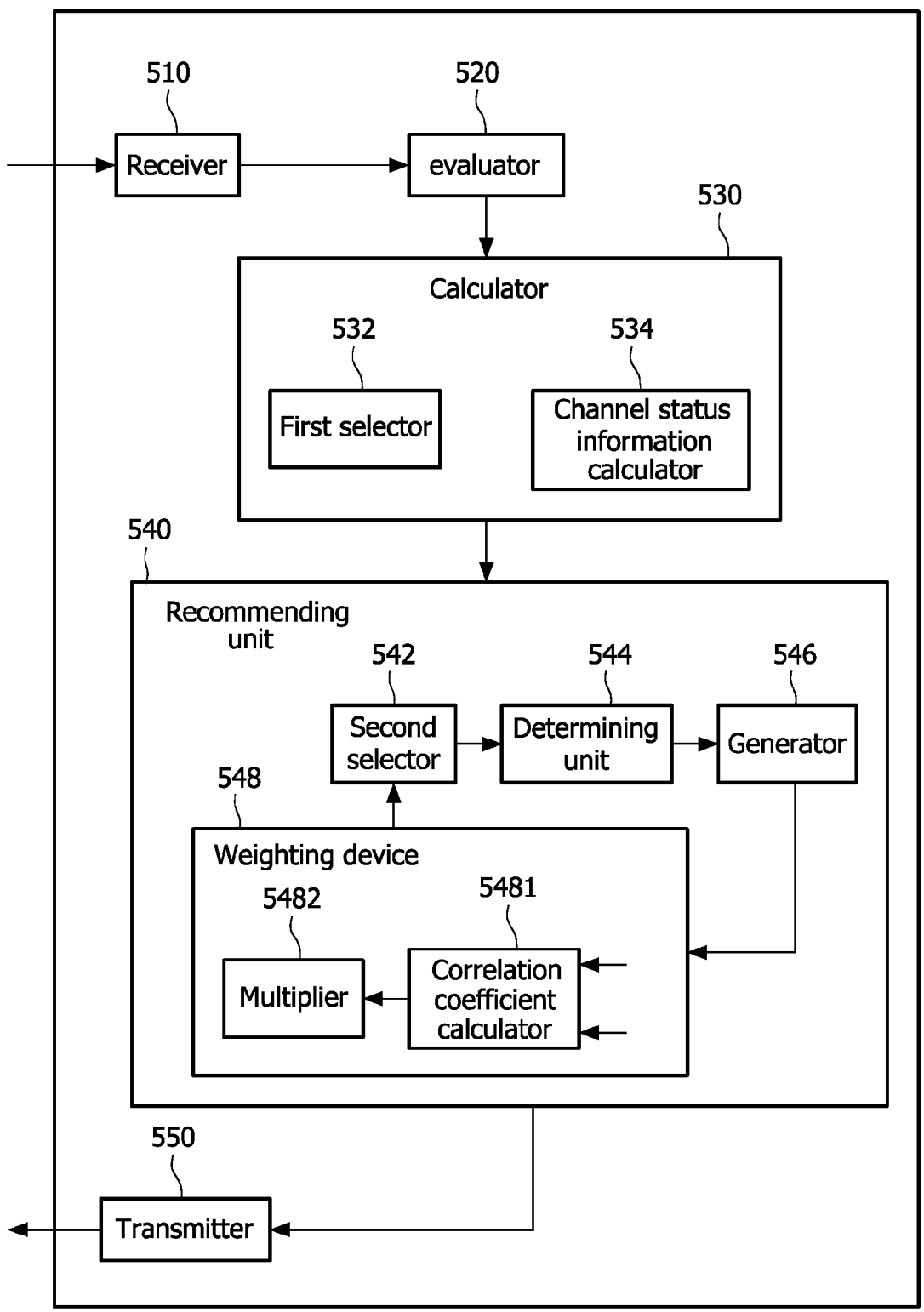
FIG. 5 illustrates a block diagram of a terminal according to an embodiment of the invention.

For utilizing the method of the invention, FIG. 5 illustrates a block diagram of a terminal according to an embodiment of the invention. The terminal 500 includes a receiver 510, an evaluator 520, a calculator 530, a recommending unit 540, and a transmitter 550. The receiver 510 is configured to receive a plurality of signals from a base station. The evaluator 520 is configured to evaluate a channel response matrix corresponding to the plurality of received signals, wherein, each element of the channel response matrix is used for representing a channel response of a channel corresponding to a signal. The calculator 530 is configured to calculate a plurality of channel status informations, wherein each of the channel status informations corresponds to a pre-coding vector in the predefined pre-coding codebook. The recommending unit 540 is configured to generate a recommended pre-coding codebook based on the correlation coefficients between pre-coding vectors and the corresponding channel status information, wherein each recommended pre-coding vector is a pre-coding vector in the predefined pre-coding codebook. The transmitter 550 is configured to transmit the recommended pre-coding codebook and a plurality of corresponding channel status informations to the base station.

The calculator 530 includes: a first selector 532 for selecting a pre-coding vector from the predefined pre-coding codebook; and a channel status information calculator 534 for calculating a channel status information.

The recommending unit 540 includes: a second selector 542, a determining unit 544, a generator 546 and a weighting device 548. The second selector 542 is configured to select maximum channel status information. The determining unit 544 is configured to determine a pre-coding vector corresponding to the maximum channel status information. The generator 546 is configured to add the pre-coding vector selected by the determining unit to the recommended pre-coding codebook. The weighting device 548 is configured to perform a weighting operation on the plurality of channel status informations, which weighting device further comprises: a correlation coefficient calculator 5481 for calculating the correlation coefficient between two pre-coding vectors; and a multiplier 5482 for multiplying the correlation coefficient with corresponding channel status information to update the corresponding channel status information.

Figure 6:
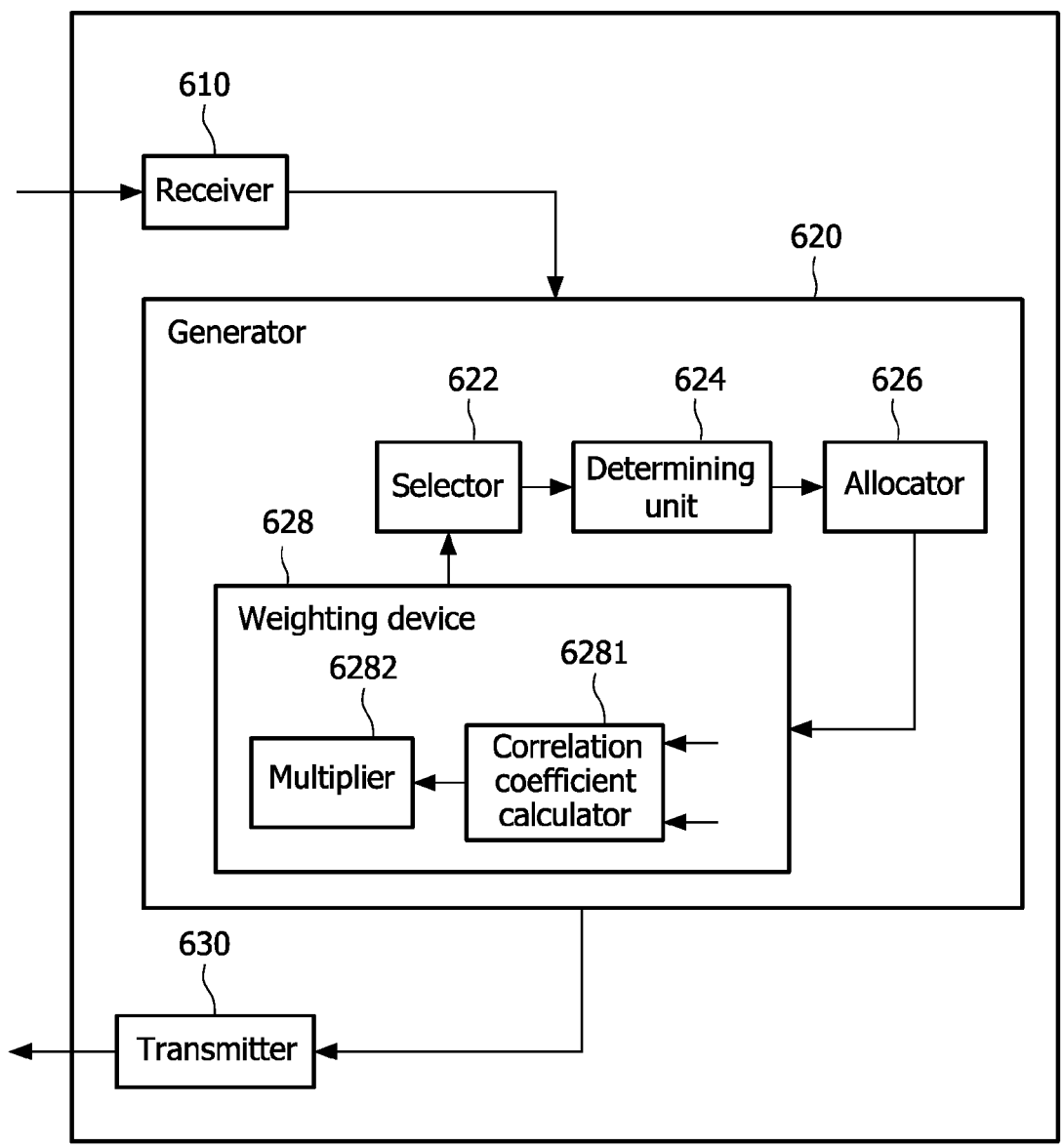
FIG. 6 illustrates a block diagram of a base station according to an embodiment of the invention.

For utilizing the method of the invention, FIG. 6 illustrates a block diagram of a base station according to an embodiment of the invention. The base station 600 includes a receiver 610, a generator 620 and a transmitter 630. The receiver 610 is configured to receive a plurality of feedback signals from a plurality of terminals, wherein, at least one feedback signal includes a plurality of recommended pre-coding vectors and a plurality of corresponding channel status informations. The generator 620 is configured to generate a pre-coding codebook based on the plurality of feedback signals, wherein at least one pre-coding vector in the pre-coding codebook is determined based on a correlation coefficient between at least two recommended pre-coding vectors. The transmitter 630 is configured to perform transmission operations using the pre-coding codebook. The transmitter 630 is further configured to transmit signals without being pre-coding vectored.

The generator 620 further includes a selector 622, a determining unit 624, an allocator 626 and a weighting device 628. The selector 622 is configured to select maximum channel status information from the plurality of channel status informations. The determining unit 624 is configured to determine a pre-coding vector and a terminal corresponding to the maximum channel status information, and a corresponding transmitting antenna. The allocator 626 is configured to allocate the determined pre-coding vector to the determined transmitting antenna. The weighting device 628 is configured to perform a weighting operation on the plurality of channel status informations, which weighting device further comprises: a correlation coefficient calculator 6281 for calculating a correlation coefficient between two pre-coding vectors; and a multiplier 6282 for multiplying the correlation coefficient with corresponding channel status information to update the corresponding channel status information.

It will be appreciated by those skilled in the art that various modifications are possible to the method and apparatus thereof provided in various embodiments of the invention without departing from the spirit or scope of the invention. Therefore, the scope of the invention is limited only by the appended claims.

The invention claimed is:

1. A method of recommending a pre-coding vector in a terminal in a multi-user MIMO system, the method comprising:
   (a) calculating a channel response matrix, using a plurality of received signals, wherein each element of the channel response matrix describes a channel status response of a channel between the terminal and a corresponding base station;
   (b) calculating a plurality of channel status informations, using a predefined pre-coding codebook and the channel response matrix, wherein each of the plurality of channel status informations corresponds to a pre-coding vector in the predefined pre-coding codebook;
   (c) selecting a plurality of pre-coding vectors from the predefined pre-coding codebook as a recommended pre-coding codebook, using a correlation coefficient between the pre-coding vectors of the predefined pre-coding codebook and the plurality of channel status informations; and
   (d) generating a feedback signal based on the recommended pre-coding codebook and a plurality of corresponding channel status informations, and transmitting the feedback signal to the base station, wherein each of the plurality of corresponding channel status informations corresponds to a recommended pre-coding vector in the recommended pre-coding codebook.

2. The method of claim 1, wherein, in step (b), the channel status information is calculated according to the equation $$CSI_i = \frac{t_i^H H^H H t_i}{\sum_{j \in \phi_i} t_j^H H^H H t_j + N_0}, \quad i = \{1, \ldots, M\},$$

$t_i$ representing the ith pre-coding vector in the predefined pre-coding codebook $T=\{t_1, t_2, \ldots t_M\}$, H representing the channel response matrix, $\phi_i$ representing a set of pre-coding vectors in the predefined pre-coding codebook other than $t_1$, $N_0$ representing a noise variance of a channel, and $CSI_i$ representing the channel status information corresponding to the pre-coding vector $t_i$.

3. The method of claim 1, wherein step (c) further comprises:

(i) selecting a maximum channel status information from the plurality of channel status informations;

(ii) determining a pre-coding vector corresponding to the maximum channel status information as a first recommended pre-coding vector in the recommended pre-coding codebook;

(iii) for each of the other channel status informations, performing a weighting operation on each of the other channel status informations, based on the correlation coefficient between the first recommended pre-coding vector and a pre-coding vector corresponding to each of the other channel status informations, to generate a weighted channel status information;

(iv) selecting a maximum weighted channel status information from the plurality of weighted channel status informations; and (v) determining a pre-coding vector corresponding to the maximum weighted channel status information as a second recommended pre-coding vector in the recommended pre-coding codebook.

4. The method of claim 3, wherein step (c) further performs the following steps several times:

I) for each weighted channel status information generated in the previous weighting step, performing a weighting operation on the weighted channel status information, according to the correlation coefficient between the pre-coding vector corresponding to the weighted channel status information and the recommended pre-coding vector determined in the previous determining step, to update the weighted channel status information;

II) selecting a maximum weighted channel status information from the plurality of weighted channel status informations generated in step (I); and III) determining a pre-coding vector corresponding to the maximum weighted channel status information as a recommended pre-coding vector to be added to the recommended pre-coding codebook.

5. The method of claim 3, wherein the weighted channel status information is calculated according to the equation $CSI_{current}(i)=f(e_i,e_j)^\alpha CSI_{previous}(i)^\beta$, wherein, $f(e_i,e_j)$ is the correlation coefficient between the pre-coding vectors $e_i$ and $e_j$, the pre-coding vector $e_j$ is any one of the first recommended pre-coding vector in step (iii) and the recommended pre-coding vector in step (I), the pre-coding vector $e_i$ is any one of the pre-coding vector corresponding to the channel status information in step (iii) and the pre-coding vector corresponding to the weighted channel status information in step (I), $CSI_{previous}(i)$ is any one of channel status information in step (iii) and the weighted channel status information in step (I), $CSI_{current}(i)$ is any one of the weighted channel status information in step (iii) and the weighted channel status information in step (I), and $\alpha$ and $\beta$ are predefined natural numbers.

6. The method of claim 5, wherein the correlation coefficient is calculated according to any one of the equations $$f(e_i, e_j) = \sqrt{1 - \left|\frac{e_i^H e_j}{\|e_i\| \cdot \|e_j\|}\right|^2}$$

and $$f(e_i, e_j) = 1 - \left|\frac{e_i^H e_j}{\|e_i\| \cdot \|e_j\|}\right|,$$

wherein, $f(e_i, e_j)$ is the correlation coefficient between the pre-coding vectors $e_i$ and $e_j$, and the pre-coding vectors $e_i$ and $e_j$ are the ones in the predefined pre-coding codebook.

7. The method of claim 1, wherein the feedback signal comprises any one of each recommended pre-coding vector in the recommended pre-coding codebook and an index number of the recommended pre-coding vector in the predefined pre-coding codebook.

8. The method of claim 1, wherein each of the received signals is acquired after a signal has been transmitted over a channel, and wherein the signal is any one of an independent predefined pilot signal and a predefined pilot sequence in a signal.

9. The method of claim 1, wherein the channel status information is any one of a signal-noise ratio, a signal-interference ratio and a channel status indicator.

10. A method of transmitting data in a multi-user MIMO system which includes a base station and a plurality of terminals, the method comprising the steps of:

(a) receiving a plurality of feedback signals from the plurality of terminals, wherein at least one feedback signal includes a plurality of recommended pre-coding vector informations and a plurality of channel status informations, each of the plurality of channel status informations corresponding to a recommended pre-coding vector information, and each of the recommended pre-coding vector informations being used for determining a corresponding pre-coding vector in a predefined pre-coding codebook as a recommended pre-coding vector;

(b) generating a pre-coding codebook based on the plurality of feedback signals, wherein at least one pre-coding vector in the pre-coding codebook is determined based on a correlation coefficient between at least two recommended pre-coding vectors; and (c) performing the transmission operation using the pre-coding codebook.

11. The method of claim 10, before step (a), further including the step of:

transmitting a plurality of pilot signals, without said pilot signals being precoded, to the plurality of terminals.

12. The method of claim 10, wherein at least two pre-coding vectors in the pre-coding codebook are non-orthogonal.

13. The method of claim 10, wherein step (b) further includes the steps of:

(i) selecting a maximum channel status information from all the channel status informations;

(ii) determining a pre-coding vector and a terminal corresponding to the maximum channel status information, and a transmitting antenna corresponding to the determined pre-coding vector and the determined terminal, on as to allocate the determined pre-coding vector to the transmitting antenna;

(iii) for each of the other channel status informations, performing a weighting operation on the channel status information, based on the correlation coefficient between the determined pre-coding vector and a precoding vector corresponding to the channel status information, to acquire a corresponding weighted channel status information;

(iv) selecting a maximum weighted channel status information from all the weighted channel status informations generated in step (iii); and (v) determining a pre-coding vector and a terminal corresponding to the maximum weighted channel status information, and a transmitting antenna corresponding to the determined pre-coding vector and the determined terminal, so as to allocate the determined pre-coding vector to the transmitting antenna.

14. The method of claim 13, wherein step (b) further performs the following steps a plurality of times:

I) for each weighted channel status information generated in the previous weighting step, performing a weighting operation on the weighted channel status information, according to the correlation coefficient between a determined pre-coding vector determined in the previous determining step and a pre-coding vector corresponding to the weighted channel status information, to update the weighted channel status information;

II) selecting a maximum weighted channel status information from all the weighted channel status informations updated in step (I); and III) determining a pre-coding vector and a terminal corresponding to the maximum weighted channel status information and a transmitting antenna corresponding to the terminal, so as to allocate the determined precode to the transmitting antenna.

15. The method of claim 13, wherein the weighted channel status information is calculated according to the equation $CSI_{current}(i)=f(e_i,e_j)^{\alpha} CSI_{previous}(i)^{\beta}$, $f(e_i,e_j)$ representing the correlation coefficient between the pre-coding vectors $e_i$ and $e_j$, the pre-coding vector $e_j$ is the determined pre-coding vector, the pre-coding vector $e_i$ is the pre-coding vector corresponding to the maximum channel status information in step (iii) and the pre-coding vector corresponding to the weighted channel status information in step (I), $CSI_{previous}(i)$ representing any one of the channel status information in step (iii) and the weighted channel status information in step (I), $CSI_{current}(i)$ representing any one of the weighted channel status information in step (iii) and the weighted channel status information updated in step I), and $\alpha$ and $\beta$ representing predefined natural numbers.

16. The method of claim 15, wherein the correlation coefficient is calculated according to any one of the equations $$f(e_i, e_j) = \sqrt{1 - \left|\frac{e_i^H e_j}{\|e_i\| \cdot \|e_j\|}\right|^2}$$

and $$f(e_i, e_j) = 1 - \left|\frac{e_i^H e_j}{\|e_i\| \cdot \|e_j\|}\right|,$$

wherein, $f(e_i,e_j)$ is the correlation coefficient between the pre-coding vectors $e_i$ and $e_{j_o}$.

17. An apparatus for recommending pre-coding vectors in a multi-user MIMO system, comprising:

a receiver, configured to receive a plurality of signals from abuse station;

an evaluator, configured to evaluate a channel response matrix corresponding to the plurality of received signals, w'herein each element of the channel response matrix represents a channel response of a channel corresponding to the received signal;

a calculator, configured to calculate a plurality of channel status informations using a predefined pre-coding codebook and the channel response matrix, wherein each of the channel status informations corresponds to a pre-coding vector in the predefined pre-coding codebook;

a recommending unit, configured to select a plurality of pre-coding vectors from the predefined pre-coding codebook as a recommended pre-coding codebook, the selection being based on correlation coefficients between pre-coding vectors in the predefined pre-coding codebook and the plurality of channel status informations; and a transmitter, configured to transmit the recommended pre-coding codebook and a plurality of corresponding channel status informations to the base station, wherein each of the channel status informations corresponds to a recommended pre-coding vector in the recommended pre-coding codebook.

18. The apparatus of claim 17, wherein the calculator further includes:

a first selector, configured to select a pre-coding vector from the predefined pre-coding codebook; and a channel status information calculator, configured to calculate a channel status information according to the equation $$CSI_i = \frac{t_i^H H^H H t_i}{\sum_{j \in \phi_i} t_j^H H^H H t_j + N_0}, \quad i = \{1, \ldots, M\},$$

wherein, $t_i$ represents a pre-coding vector selected by the first selector, H represents the channel response matrix, $\phi_i$ represents a set composed of the pre-coding vectors in the predefined pre-coding codebook except for $t_i$, $N_0$ represents a noise variance of a channel, and $CSI_i$ represents the channel status information corresponding to the pre-coding vector $t_i$.

19. The apparatus of claim 17, wherein the recommending unit comprises:

a second selector, configured to select a maximum channel status information from the plurality of channel status informations;

a determining unit, configured to determine a pre-coding vector corresponding to the maximum channel status information;

a generator, configured to add the pre-coding vector selected by the determining unit to the recommended pre-coding codebook;

a weighting device, configured to perform a weighting operation on the plurality of channel status informations, the weighting device further comprising:

a correlation coefficient calculator, configured to calculate the correlation coefficient between two pre-coding vectors; and a multiplier, configured to multiply the correlation coefficient by a corresponding channel status information to update the corresponding channel status information.

20. An apparatus for transmitting data in a multi-user MIMO system, comprising:

a receiver, configured to receive a plurality of feedback signals from a plurality of terminals in the multi-user MIMO system, wherein, at least one feedback signal includes a plurality of recommended pre-coding vector information and a plurality of corresponding channel status information, each of the recommended pre-coding vector information is used for determining a corresponding pre-coding vector in a predefined pre-coding codebook as a recommended pre-coding vector;

a generator, configured to generate a pre-coding codebook based on the plurality of feedback signals, wherein, at least one pre-coding vector in the pre-coding codebook is determined based on a correlation coefficient between at least two recommended pre-coding vectors; and a transmitter, configured to perform transmission operation using the pre-coding codebook.

21. The apparatus of claim 20, wherein the transmitter is further configured to transmit signals without being precoded by the pre-coding codebook.

22. The apparatus of claim 20, wherein the generator further comprises:

a selector, configured to select a maximum channel status information from the plurality of channel status information;

a determining unit, configured to determine a pre-coding vector and a terminal corresponding to the maximum channel status information, and a transmitting antenna corresponding to the determined pre-coding vector and the determined terminal;

an allocator, configured to allocate the determined pre-coding vector to the determined transmitting antenna;

a weighting device, configured to perform weighting operation on the plurality of channel status information, the weighting unit further comprising:

a correlation coefficient calculator, configured to calculate a correlation coefficient between two pre-coding vectors; and a multiplier, configured to multiply the correlation coefficient with a corresponding channel status information to update the corresponding channel status information.

\* \* \* \* \*